(12) United States Patent
Kruglick

(10) Patent No.: US 8,938,634 B2
(45) Date of Patent: Jan. 20, 2015

(54) USER GENERATED DATA CENTER POWER SAVINGS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 254 days.

(21) Appl. No.: 13/514,337

(22) PCT Filed: Jan. 25, 2012

(86) PCT No.: PCT/US2012/022541
§ 371 (c)(1),
(2), (4) Date: Jun. 7, 2012

(87) PCT Pub. No.: WO2013/112145
PCT Pub. Date: Aug. 1, 2013

(65) Prior Publication Data
US 2013/0191672 A1 Jul. 25, 2013

(51) Int. Cl.
*G06F 1/32* (2006.01)
*G06F 1/00* (2006.01)
*G06F 1/26* (2006.01)
*G06F 9/45* (2006.01)
*G06F 9/455* (2006.01)

(52) U.S. Cl.
CPC .............. *G06F 1/3287* (2013.01); *G06F 8/51* (2013.01); *G06F 9/45533* (2013.01); *G06F 8/40* (2013.01); *G06F 1/26* (2013.01); *G06F 1/32* (2013.01); *G06F 1/3246* (2013.01); *G06F 8/41* (2013.01); *Y02B 60/32* (2013.01)
USPC ........... 713/324; 713/300; 713/310; 713/320; 717/136; 717/147; 718/1

(58) Field of Classification Search
CPC ......... G06F 1/26; G06F 1/32; G06F 9/45533; G06F 1/3246; G06F 8/41; G06F 8/40; G06F 8/51
USPC .......... 713/300, 310, 320, 324; 717/136, 147; 718/1
See application file for complete search history.

(56) References Cited

U.S. PATENT DOCUMENTS

| 5,560,022 | A |   | 9/1996 | Dunstan et al. |
| 5,638,541 | A | * | 6/1997 | Sadashivaiah ................ 713/323 |
| 6,131,166 | A |   | 10/2000 | Wong-Insley |
| 7,131,099 | B2 |   | 10/2006 | Schuppe |
| 7,844,839 | B2 |   | 11/2010 | Palmer et al. |

(Continued)

OTHER PUBLICATIONS

International Search Report & Written Opinion dated May, 2012 in PCT Application No. PCT/US12/22541.

(Continued)

*Primary Examiner* — Ji H Bae
(74) *Attorney, Agent, or Firm* — Hope Baldauff LLC

(57) ABSTRACT

Technologies are described herein for providing power savings in a data center. Some example technologies may identify some user-provided hardware independent power saving codes from multiple virtual machines within the data center. The technologies may convert at least a portion of the user-provided hardware independent power saving codes into a device power management message specific to a computing system in the data center. The technologies may provide the device power management message to the computing system. The computing system may be configured to enable or disable one or more devices within the computing system according to the device power management message.

22 Claims, 5 Drawing Sheets

(56) References Cited

U.S. PATENT DOCUMENTS

| | | | |
|---|---|---|---|
| 2007/0288776 | A1 | 12/2007 | DeMent et al. |
| 2009/0070776 | A1* | 3/2009 | Dahlstedt .................. 719/312 |
| 2009/0217072 | A1 | 8/2009 | Gebhart et al. |
| 2010/0328849 | A1 | 12/2010 | Ewing et al. |
| 2011/0106949 | A1 | 5/2011 | Patel et al. |
| 2011/0202467 | A1 | 8/2011 | Hilber et al. |

OTHER PUBLICATIONS

Hwang, Y,S, et al., "A predictive dynamic power management technique for embedded mobile devices," Consumer Electronics, IEEE Transactions on 56, No. 2 (2010): 713-719. Abstract only.

Kansal, A et al., "Virtual machine power metering and provisioning," in Proceedings of the 1st ACM symposium on Cloud computing (ACM, 2010), 39-50.

Krishnan, B. et al., "VM power metering: feasibility and challenges," ACM SIGMETRICS Performance Evaluation Review 38, No. 3 (2011): 56-60.

Valentino-DeVries, J., "More Predictions on the Huge Growth of 'Cloud Computing'," [http://blogs.wsj.com/digits/2011/04/21/more-predictions-on-the-huge-growth-of-cloud-computing/] Apr. 21, 2011.

* cited by examiner

USER GENERATED DATA CENTER POWER SAVINGS

BACKGROUND

Unless otherwise indicated herein, the materials described in this section are not prior art to the claims in this application and are not admitted to be prior art by inclusion in this section.

Conventionally, power optimization of data centers may be performed at the hardware level using basic hardware-level optimizations. For example, the data center may perform per-core power gating of one or more processor cores in the data center. The data center may also provide to a rack an amount of power less than the processor cores would utilize if all of the processor cores in the rack were to peak at once. This approach may take advantage of an observation that the processor cores in the rack rarely operate to peak at once. In the rare occurrences in which all of the processor cores do peak, the data center may perform hardware-coded frequency throttling.

The above-described power optimization techniques are typically initiated and performed by the data center without input from users of the data center. Generally, users of the data center may not provide input regarding power optimization to the data center for various reasons. First, the data center may not provide a mechanism with which users can submit information regarding power optimization. Second, the data center may not be forthright about its hardware specification or configuration. Without such hardware specification or configuration, a user may have difficulty submitting relevant information regarding hardware-level optimizations to the data center.

SUMMARY

The present disclosure generally describes techniques for providing power savings in a data center. Some example methods may identify some user-provided hardware independent power saving codes from multiple virtual machines within the data center. Example methods may convert at least a portion of the user-provided hardware independent power saving codes into a device power management message specific to a computing system in the data center. Example methods may provide the device power management message to the computing system. The computing system may be configured to enable or disable one or more devices within the computing system according to the device power management message.

The present disclosure generally further describes some computer-readable storage media adapted provide power savings in a data center. The computer-readable storage media may include computer-executable instructions stored thereon which, when executed by a computer, cause the computer to perform one or more operations. Some example computer-executable instructions may cause the computer to identify some user-provided hardware independent power saving codes included within application code to be executed by multiple virtual machines within a computing system in the data center. Example computer-executable instructions may cause the computer to convert at least a portion of the user-provided hardware independent power saving codes into a device power management message specific to the computing system. Example computer-executable instructions may cause the computer to provide the device power management message to the computing system. The computing system may be configured to enable or disable one or more devices within the computing system according to the device power management message when the computing system executes the application code.

The present disclosure generally also describes some data centers adapted to provide power savings. Some example data centers may include a first computing system having a first processor-based hardware configuration that includes a first device and a first management unit coupled to the first device. Example data centers may include a second computing system having a second processor-based hardware configuration that includes a second device and a second management unit coupled to the second device. Example data centers may include a first driver executed by first computing system. The first driver is configured to identify a first portion of some user-provided hardware independent power saving codes from application code executing on multiple first virtual machines within the first computing system, convert the first portion of the user-provided hardware independent power saving codes into a device power management message specific to the first computing system in the data center, and provide the device power management message to the first management unit. The first management unit may be configured to enable and disable the first device according to the first device power management message. Example data centers may include a second driver executed by the second computing system. The second driver may be configured to identify a second portion of the user-provided hardware independent power saving codes from the application code executing on multiple second virtual machines within the second computing system, convert the second portion of the user-provided hardware independent power saving codes into a second device power management message specific to the second computing system in the data center, and provide the second device power management message to the second management unit. The second management unit may be configured to enable and disable the second device according to the second device power management message.

The foregoing Summary is illustrative only and is not intended to be in any way limiting. In addition to the illustrative aspects, embodiments, and features described above, further aspects, embodiments, and features will become apparent by reference to the Figures and the following Detailed Description.

DESCRIPTION OF THE FIGURES

The foregoing and other features of this disclosure will become more fully apparent from the following Detailed Description, accompanying Figures, and appended claims. Understanding that these Figures depict only several embodiments in accordance with the disclosure and are, therefore, not to be considered limiting of its scope, the disclosure will be described with additional specificity and detail with reference to the accompanying Figures, in which:

Figure 1:
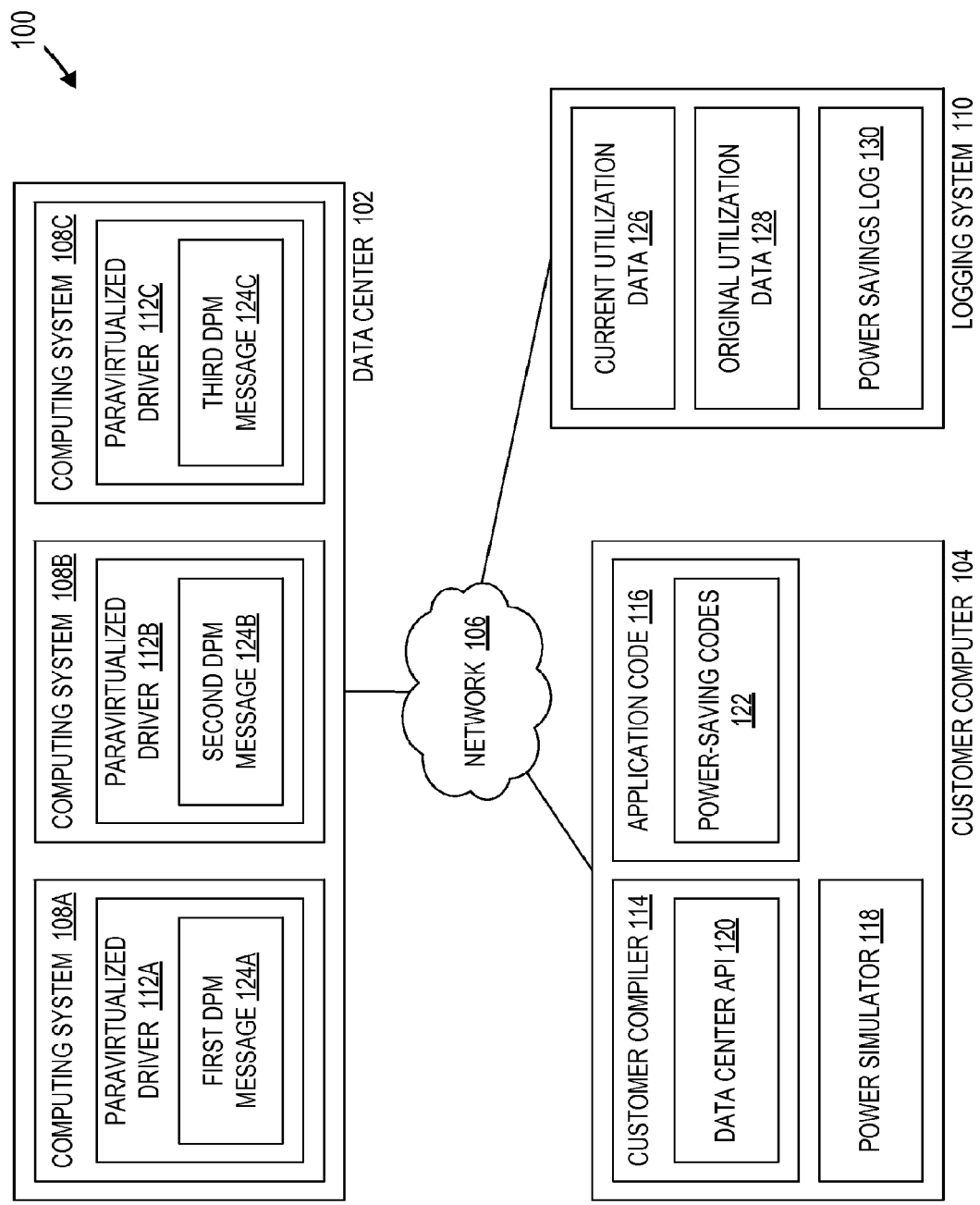
FIG. 1 is a functional block diagram illustrating an example network architecture adapted to provide power savings in a data center.

all arranged in accordance with at least some embodiments presented herein.

DETAILED DESCRIPTION

In the present Detailed Description, reference is made to the accompanying Figures, which form a part hereof. In the Figures, similar symbols typically identify similar components, unless context dictates otherwise. The illustrative embodiments described in the Detailed Description and Figures are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies adapted to provide user-initiated power management of a data center. The data center may make available to users (e.g., customer, programmer, etc.) multiple hardware-independent power saving codes. For example, the data center may make available to a user an application programming interface ("API") with which the user can define one or more hardware-independent power saving codes. The user may utilize the API to insert the defined hardware-independent power saving codes into application code of the user's application.

The user may provide the application code to the data center for execution. One or more computing systems in the data center may be assigned to execute the application code. A computing system may include a paravirtualized driver adapted to convert the hardware-independent power saving codes into a device power management message specific to the computing system. In particular, the device power management message may be specific to the hardware-related specification or configuration of the computing system. When the computing system executes the application code, the computing system may be adapted to utilize the device power management message in order to manage power utilization. For example, the device power management message may instruct an operating system or other hardware manager to enable/disable or turn on/off one or more hardware devices in the computing system.

Data centers can include multiple computing systems in which one or more of the computing systems include multiple virtual machines. That is, multiple virtual machines may operate on the same hardware. In some implementations, a hypervisor, for example, may be configured to aggregate hardware-independent power saving codes (or corresponding device power management messages) from the multiple virtual machines within the same hardware. In some other implementations, a web service may aggregate the hardware-independent power saving codes (or corresponding device power management messages) on a separate computing system and provide the aggregated device power management messages to the hypervisor. The hypervisor may be configured to implement the aggregated hardware-independent independent power saving codes or aggregated device power management messages.

Through the above technologies, a user can initiate hardware-level optimizations in the data center. The utilization of the hardware-independent power saving codes and the paravirtualized drivers may allow the user to initiate hardware-level optimizations without specific knowledge of the hardware-related specification or configuration of the data center. Further, the utilization of the API may allow a programmer without extensive knowledge of power management techniques to initiate hardware-level optimizations by defining broader hardware-independent power saving codes. In some instances, the data center may also provide incentive to the user to initiate hardware-level optimizations by logging power savings caused by the user's hardware-independent power saving codes and providing a corresponding benefit to the user.

FIG. 1 is a functional block diagram illustrating an example network architecture 100 adapted to provide power savings in a data center 102, arranged in accordance with at least some embodiments presented herein. The network architecture 100 may include the data center 102 and a customer computer 104 communicatively coupled via a network 106. The data center 102 may include a first computing system 108A, a second computing system 108B, and a third computing system 108C. The computing systems 108A-108C may be collectively referred to as computing systems 108. In some embodiments, the data center 102 may further include a logging system 110 coupled to the computing systems 108. Although three computing systems 108 are illustrated in the data center 102 of FIG. 1 for simplicity, one skilled in the art will appreciate that other implementations of the data center 102 may include any number of computing systems.

The first computing system 108A may include a first paravirtualized driver 112A. The second computing system 108B may include a second paravirtualized driver 112B. The third computing system 108C may include a third paravirtualized driver 112C. The paravirtualized drivers 112A-112C may be collectively referred to as paravirtualized drivers 112. The customer computer 104 may include a customer compiler 114, application code 116 of a customer application, and a power simulator 118.

In an illustrative implementation of the network architecture 100, a customer of the data center 102 may utilize the customer computer 104 in order to create customer applications, such as the customer application associated with the application code 116, via the customer compiler 114. The customer may also desire to implement user-initiated power management in the customer applications. To this end, the customer may have information on a data center API 120. For example, the customer may download sample code for the data center API 120 from a remote data store (not shown). In some embodiments, the power simulator 118 may also be included in the download or may be retrieved separately from the remote data store.

The data center API 120 may provide a set of high-level routines, object structures, or data structures that a programmer can utilize to insert hardware-independent power saving codes 122 into the application code 116. Each of the hardware-independent power saving codes 122 may be associated with a hardware device or some group of hardware devices. For example, a particular hardware-independent power saving code may be associated with disk access. While disk access may refer to access of a hard drive in some implementations of a computing system, disk access may refer to access of a network-attached storage in some other implementations of the computing system. The hardware-independent power saving code allows the programmer to be unconcerned about the particular hardware specification or configuration of the computing systems 108 in the data center 102. In some other examples, additional hardware-independent power saving codes may each be associated with various combinations of processors, registers, cache memory, main memory, secondary storage, controllers, adapters, managers, or other hardware devices.

The data center API 120 may provide different approaches with which a programmer can define the hardware-independent power saving codes 122 inserted into the application code 116. In one example, the programmer may define the hardware-independent power saving codes 122 to disable or turn off (or keep disabled or turned off) a hardware device or a group of hardware devices. In another example, the programmer may define the hardware-independent power saving codes 122 to enable or turn on (or keep enabled or turned on) a hardware device or a group of hardware devices. In yet another example, the programmer may define the hardware-independent power saving codes 122 to indicate that a hardware device or a group of hardware devices will be needed at some point in the future (e.g., disk access will be needed in 10 milliseconds). This last example may allow a programmer to "warm up" a hardware device ahead of when it is needed so that any latency between when the hardware device is enabled or turned on and when the hardware device can be utilized is minimized or eliminated. In addition to the above examples, one skilled in the art will appreciate even more detailed definitions of the hardware-independent power saving codes 122.

In some cases, the programmer may have little or no experience with creating optimal definitions of the hardware-independent power saving codes 122 such that power savings is maximized. In such cases, the programmer may utilize the power simulator 118. The power simulator 118 may analyze an execution of the application code 116 with the hardware-independent power saving codes 122 and provide an estimation of power saved on a particular computing system. The programmer may utilize the power simulator 118 in order to try different definitions or arrangements of the hardware-independent power saving codes 122 and to estimate an efficacy of each of the definitions or arrangements. The power simulator 118 may also provide insight into the performance impact of power saving codes 122 by, for example, simulating the delay when deactivated components are called.

After the programmer has inserted the hardware-independent power saving codes 122 into the application code 116, the programmer may provide the application code 116 to the data center 102. The data center 102 may select one or more of the computing systems 108 to execute the application code 116. In an illustrative example, the computing systems 108 may be selected to execute the application code 116. As the computing systems 108 execute the application code 116, the computing systems 108 may read the hardware-independent power saving codes 122.

When one of the computing systems 108 reads the hardware-independent power saving codes 122, a corresponding one of the paravirtualized drivers 112 may identify at least a subset of the hardware-independent power saving codes 122 that is applicable to the computing system. Each of the paravirtualized drivers 112 may be configured to recognize certain hardware-independent power saving codes as relevant for the particular hardware devices in the corresponding computing system. For example, a hardware-independent power saving code associated with disk access may not be applicable for a computing system that handles all memory accesses via random access memory without use of an external storage device.

When the paravirtualized drivers 112 identify the corresponding subsets of the hardware-independent power saving codes 122 that are applicable to the corresponding computing systems, the paravirtualized drivers 112 may convert the subsets of the hardware-independent power saving codes 122 into corresponding device power management messages. In particular, the first paravirtualized driver 112A may convert an applicable subset of the hardware-independent power saving codes 122 into a first device power management message 124A. Due to space limitations, device power management is labeled as DPM in FIG. 1. The second paravirtualized driver 112B may convert an applicable subset of the hardware-independent power saving codes 122 into a second device power management message 124B. The third paravirtualized driver 112C may convert an applicable subset of the hardware-independent power saving codes 122 into a third device power management message 124C. The device power management messages 124A-124C may be collectively referred to as device power management messages 124. The applicable subsets of the hardware-independent power saving codes 122 may or may not overlap between the computing systems 108. Additional details regarding the various subsets of the hardware-independent power saving codes 122 associated with the computing systems 108 are provided below with reference to FIG. 2.

In an illustrative implementation, a device power management message may be an array of multiple symbols. The array may correspond to one of the computing systems 108. Each symbol may correspond to a hardware device in the corresponding one of the computing systems 108. A value representing each symbol may indicate an action performed by the corresponding one of the computing systems 108. For example, each symbol may be represented by a bit value, in accordance with some embodiments. Here, a "zero" bit value may be used to instruct the computing system to disable or turn off (or keep disable or turned off) a particular hardware device, and a "one" bit value may be used to instruct the computing system to enable or turn on (or keep enabled or turned on) a particular hardware device. In some other embodiments, the number of possible values representing each symbol may be greater than two in order to represent additional actions or to represent more detailed actions.

The computing systems 108 may implement the corresponding device power management messages 124 generated by the paravirtualized drivers 112. In particular, an operating system, hypervisor, or other hardware manager in each of the computing systems 108 may perform the actions contained in or specified by a corresponding one of the device power management messages 124. The device power management messages 124 may effectively enable/disable or turn on/off certain hardware devices in the corresponding computing systems 108 at various times as specified or indicated by the programmer. When hardware devices are disabled or turned off, the computing systems 108 may utilize less power as power is not running to those hardware devices or is reduced. When hardware devices that are disabled or turned off are needed, the device power management messages 124 may enable or turn on those hardware devices. In some cases, a hardware device may be turned on prior to being used in order to "warm up." This can minimize or eliminate potential latency between when a hardware device is enabled or turned on and when the hardware device is actually ready to be utilized.

As the computing systems 108 are executing the application code 116, the computing systems 108 may also provide current power utilization data 126 to the logging system 110. The current power utilization data 126 may indicate the amount of power utilized by the computing systems 108 when user-initiated power management as previously described was implemented. The logging system 110 may also include original power utilization data 128. The original power utilization data 128 may indicate the amount of power utilized by the computing systems 108 when user-initiated power management was not implemented.

The logging system 110 may compare the current power utilization data 126 with the original power utilization data 128 in order to identify power savings resulting from the user-initiated power management. The logging system 110 may maintain a record of the identified power savings in a power savings log 130. The power savings may be organized by customer, for example. The power savings caused by a customer as specified in the power savings log 130 may be passed on to the customer in the form of some benefit, such as a monetary benefit. For example, the administrator of the data center 102 may reduce the customer's bill by some amount. In this manner, the administrator of the data center 102 may utilize the benefit as an incentive to the customers to utilize user-initiated power management.

When creating the data center API 120, an administrator of the data center 102 may identify possible device management messages that may be generated by the computing systems 108. These device management messages may be specific to the hardware specification or configuration of each of the computing systems 108. For example, the computing systems 108 may differ in terms of processors, registers, cache memory, main memory, secondary storage, controllers, adapters, managers, or other hardware devices. The computing systems 108 may differ not only in the type of hardware devices, but also in the number or existence of certain hardware devices. In an illustrative example, the first computing system 108A may include a hard drive. The second computing system 108B may not include a hard drive or other external storage, but may instead handle memory requests via random access memory. The third computing system 108C may not include a hard drive, but may instead handle memory requests via a network-attached storage.

The administrator of the data center 102 may collect the possible device power management messages from the computing systems 108 and abstract the collection of device power management messages 124 into multiple classes. Such classes may be created such that groups of the same or related hardware devices shared between the various device power management messages 124 are included in each class. For example, a class related to disk access may include hard drives, network-attached storage, and other external storage devices. The administrator may associate each class to a corresponding hardware-independent power saving code. The administrator may configure the data center API 120 to enable customers to insert various hardware-independent power saving codes into the customer's applications.

The above process for generating the data center API 120 may utilize the computing systems 108 of the data center 102. As such, while the data center API 120 may be suitable for the particular data center 102, the data center API 120 may be sub-optimal for other data centers having a different hardware specification or configuration. In some other embodiments, the data center API 120 may be a generalized data center API that is suitable for multiple data centers. Some implementations of the generalized data center API may utilize a wider variety of power saving codes than the hardware-independent power saving codes 122 in order to account for more possible hardware devices in computing systems. Some other implementations of the generalized data center API may utilize power saving codes that are configured at a higher level of generalization than the hardware-independent power saving codes 122. For example, the generalized data center API may be part of an industry standard for data center power management.

As previously described, the data center API 120 may enable a programmer to insert the hardware-power saving codes 122, in accordance with some embodiments. In some other embodiments, the data center API 120 may further enable the programmer to set flags utilized by a hypervisor (not shown in FIG. 1) of each computing system. Each flag may represent a configurable property of the hypervisor. For example, a particular flag may inform the hypervisor that a particular process can be delayed up to a certain amount of time without impacting application performance. Such a delay may allow the hypervisor to proactively manage power peaks.

As previously described, each of the paravirtualized drivers 112 may operate in one of the computing systems 108 and may be adapted to convert the hardware-independent power saving codes 122 into an appropriate device power management message for the corresponding computer system. In some embodiments, a given computing system may operate multiple virtual machines, each of which is capable of running a separate application. In such cases, each virtual machine may be associated with its own set of hardware-independent power saving codes from the corresponding application. A hypervisor operating on the computing system may aggregate the hardware-independent power saving codes (and corresponding device power management messages) from the multiple virtual machines. In another realization, the data center API 120 may take the form of a data center service that receives power saving codes in the form of POST or GET Hypertext Transfer Protocol ("HTTP") messages from the customer application. Such an API may then collect the power saving codes emitted by applications on a particular computing system 108 and deliver them to the hypervisor on that machine, for example, via data center infrastructure management ("DCIM") messaging. The delivered codes may be the original codes or codes combined with relevant instructions only as seen in FIG. 2 and FIG. 3.

The multiple power management messages may or may not have some overlapping instructions that relate to the same hardware devices. In order to address the possibility of overlap, a hypervisor corresponding to the computing system may be configured to combine the multiple device power management messages into a single power management message. In this manner, the computing system may implement the single power management message even when multiple virtual machines are present. Additional details regarding combining multiple power management messages are provided below with reference to FIG. 3.

As previously described, a customer can utilize the data center API 120 to define the hardware-independent power saving codes 122, in accordance with some embodiments. In some other embodiments, the responsibility of defining the hardware-independent power saving codes 122 may be shifted, in part or in whole, from the customer to the customer compiler 114. In such cases, the customer compiler 114 may be an advanced customer compiler adapted to define the hardware-independent power saving codes 122 based on an analysis of the application code 116. In particular, the customer may instruct the advanced customer compiler to determine an optimal definition of the hardware-independent power saving codes 122 and to insert the hardware-independent power saving codes 122 into the application code 116. The advanced customer compiler may also be adapted to override or modify user-determined hardware-independent power saving codes with computer-determined hardware-independent power saving codes.

Figure 2:
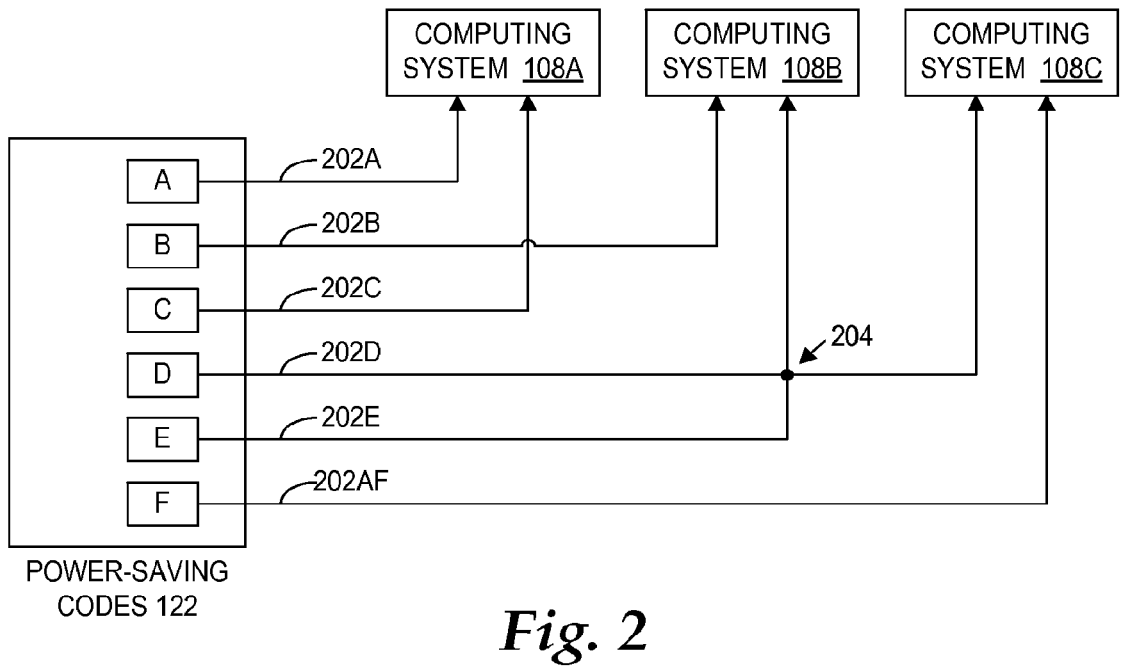
FIG. 2 is a diagram illustrating an example distribution of the hardware-independent power saving codes to multiple computing devices.
Figure 3:
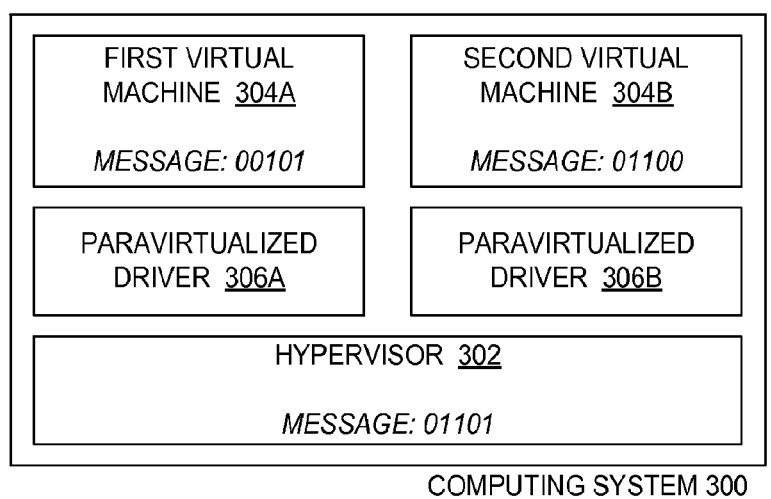
FIG. 3 is a functional block diagram illustrating an example implementation of a computing system that includes multiple virtual machines.

FIG. 2 is a diagram illustrating an example distribution of the hardware-independent power saving codes 122 to the multiple computing systems 108, arranged in accordance with at least some embodiments presented herein. The power saving codes 122 may include power saving codes A-F. According to an illustrative example, a first subset of the power saving codes 122 may include power saving codes A and C. The power saving codes A and C may be associated with the first computing system 108A as indicated by directional lines 202A, 202C. A second subset of the power saving codes 122 may include power saving codes B and E. The power saving codes B and E may be associated with the second computing system 108B as indicated by directional lines 202B, 202E. A third subset of the power saving codes 122 may include power saving codes D and F. The power saving codes D and F may be associated with the third computing system 108C as indicated by directional lines 202D, 202F. An intersection 204 along the directional lines 202D, 202E may indicate that the power saving code D is also associated with the second computing system 108B and that power saving code E is also associated with the third computing system 108C. In various other embodiments, one or more of the hardware-independent power saving codes 122 may be associated with more than one of the computing systems 108.

FIG. 3 is a functional block diagram illustrating an example implementation of a computing system 300 that includes multiple virtual machines, arranged in accordance with at least some embodiments presented herein. The computing system 300 may be another example of one of the computing systems 108. The computing system 300 may include a hypervisor 302, a first virtual machine 304A and a second virtual machine 304B. The virtual machines 304A-304B may be collectively referred to as virtual machines 304. Although two virtual machines are illustrated in the computing system 300 of FIG. 3 for simplicity, one skilled in the art will appreciate that other implementations of the computing system 300 may include any number of virtual machines.

The first virtual machine 304A may be associated with a first instance of a paravirtualized driver 306A. The second virtual machine 304B may be associated with a second instance of the paravirtualized driver 306B. In an illustrative example, the first virtual machine 304A may be assigned to run a first application having a first application code, and the second virtual machine 304B may be assigned to run a second application having a second application code. The first instance of the paravirtualized driver 306A may convert relevant hardware-independent power saving codes retrieved from the first application code into a first device power management message. The second instance of the paravirtualized driver 306B may convert relevant hardware-independent power saving codes retrieved from the second application code into a second device power management message.

Paravirtualization may generally refer to techniques for presenting a software interface to the virtual machines 304 that is similar to the underlying hardware of the computing system 300. For example, the hypervisor 302 may present paravirtualized network access to the virtual machines 304. When the virtual machines 304 transmit data via the paravirtualized network access, the data is not provided directly to network access hardware in the computing system 300. Rather, the data may be provided to a buffer managed by the hypervisor 302. The hypervisor 302 may be adapted to perform higher-level management of the data in the buffer with respect to the network access hardware.

In the example illustrated in FIG. 3, the hypervisor 302 may be adapted to perform higher-level management of multiple device power management messages associated with multiple virtual machines. Here, the first device power management message may be a bit array having a value "00101", and the second device power management message may be a bit array having a value "01100". In this example, each bit in the bit array may correspond to a particular hardware device.

Here, a "one" bit value may instruct the operating system or other hardware manager to enable or turn on (or keep enabled or turned on) the corresponding hardware device. A "zero" bit value may instruct the operating system or other hardware manager to disable or turn off (or keep disabled or turned off) the corresponding hardware device. Thus, the first device power management message may contain instructions to enable or turn on (or keep enabled or turned on) the third and fifth hardware devices, and to disable or turn off (or keep disabled or turned off) the first, second, and fourth hardware devices should be disabled or turned off (or stay disabled or turned off). The second device power management message may contain instructions to enable or turn on (or keep enabled or turned on) the second and third hardware devices, and to disable or turn off (or keep disabled or turned off) the first, fourth, and fifth hardware devices.

The hypervisor 302 may be configured to perform a logical OR operation on the two bit arrays. In this example, the hypervisor 302 may compute a result of "01101" when performing the logical OR operation on the bit array "00101" and the bit array "01100". The resulting bit array "01101" may instruct the operating system or other hardware manager to enable or turn on (or keep enabled or turned on) the second, third, and fifth hardware devices and to disable or turn off (or keep disabled or turned off) the first and fourth hardware devices.

Figure 4:
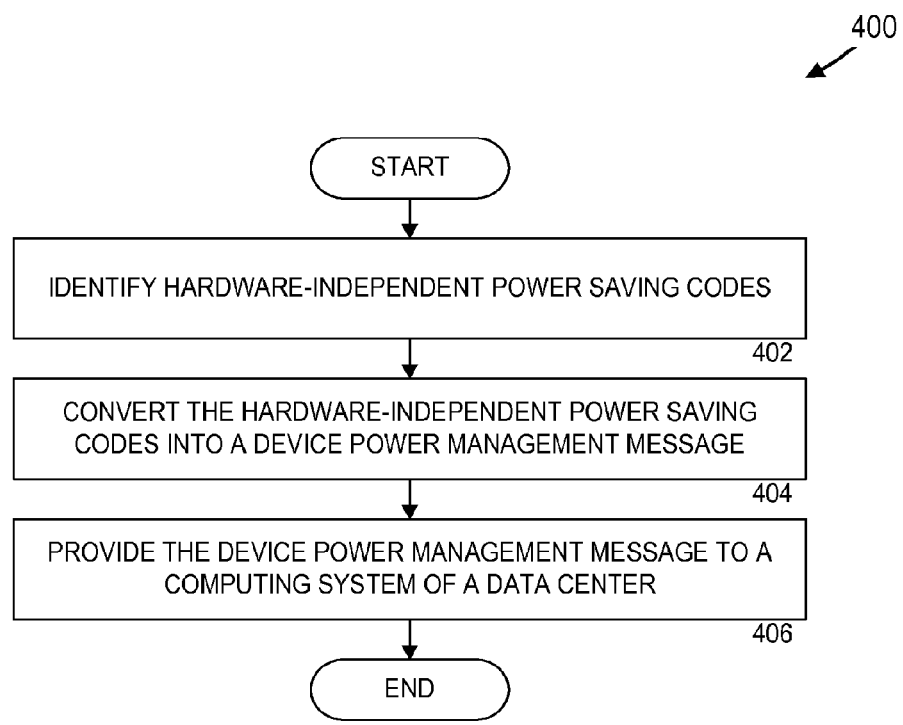
FIG. 4 is a flow diagram illustrating an example process adapted to provide power savings in the data center.

FIG. 4 is a flow diagram illustrating an example process 400 adapted to provide power savings in the data center 102, arranged in accordance with at least some embodiments presented herein. The process 400 may include various operations, functions, or actions as illustrated by one or more blocks 402-406.

The process 400 may begin at block 402 (Identify Hardware-Independent Power Saving Codes), where a driver, such as one of the paravirtualized drivers 112, may be configured to identify at least a subset of the hardware-independent power saving codes 122 within application code to be executed by a computing system in a data center. The subset of the hardware-independent power saving codes 122 may be applicable to the computing system. In some implementations, the subset of the hardware-independent power saving codes 122 may be identified from multiple virtual machines operating on the computing system. The computing system may include one or more hardware devices. Block 402 may also be realized as a data center service that identifies hardware-independent power saving codes in messages sent to it by applications using existing data center API messaging techniques. Block 402 may be followed by block 404.

At block 404 (Convert the Hardware-Independent Power Saving Codes into a Device Power Management Message), the driver may be configured to convert the identified subset of hardware-independent power saving codes into a device power management message specific to the specific hardware specification or configuration of the computing system. In some embodiments, the device power management message may be implemented as an array of symbols, where each symbol may represent one of the hardware devices in the computing system. The value represented by each symbol may be used to indicate an action to be performed on the corresponding hardware device. For example, the action may be to enable/disable or turn on/off the corresponding hardware device. Block 404 may be followed by block 406.

At block 406 (Provide the Device Power Management Message to a Computing System of a Data Center), the driver may be configured to provide the device power management message to computing system. The computing system may be configured to implement the device power management message. In particular, an operating system or other hardware manager within the computing system may enable/disable or turn on/off the appropriate hardware devices in accordance with the device power management message. In this manner, power savings can be achieved within the data center. After block 406, the process 400 either repeat (e.g., periodically, continuously, or on demand as needed) or terminate.

Figure 5:
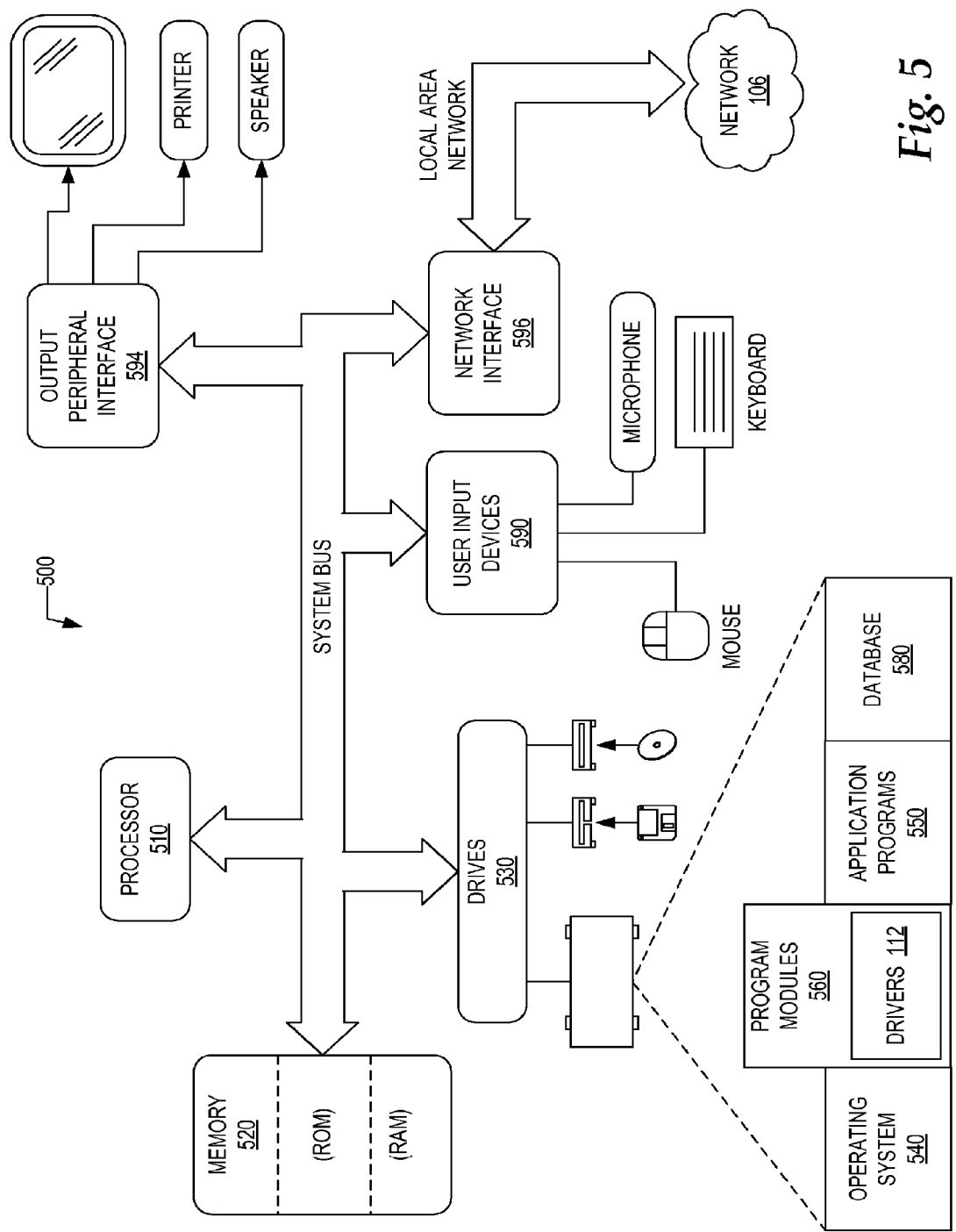
FIG. 5 is a block diagram illustrating a computer hardware architecture for an example computing system.

FIG. 5 is a block diagram illustrating a computer hardware architecture for an example computing system, arranged in accordance with at least some embodiments presented herein. FIG. 5 includes a computer 500, including a processor 510, memory 520, and one or more drives 530. The computer 500 may be implemented as a conventional computer system, an embedded control computer, a laptop, or a server computer, a mobile device, a set-top box, a kiosk, a vehicular information system, a mobile telephone, a customized machine, or other hardware platform. The processor 510 may be configured to implement the logic described in FIG. 1 including at least one of the drivers 112. Alternatively, the processor 510 may be configured to implement logic described in FIG. 1 including the customer compiler 114 or the power simulator 118.

The drives 530 and their associated computer storage media, provide storage of computer readable instructions, data structures, program modules and other data for the computer 500. The drives 530 can include an operating system 540, application programs 550, program modules 560, and a database 580. The computer 500 further includes user input devices 590 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 510 through a user input interface that is coupled to a system bus, but may be coupled by other interface and bus structures, such as a parallel port, game port or a universal serial bus ("USB"). Computers such as the computer 500 may also include other peripheral output devices such as speakers, which may be coupled through an output peripheral interface 594 or the like.

The computer 500 may operate in a networked environment using logical connections to one or more computers, such as a remote computer coupled to a network interface 596. The remote computer may be a personal computer, a server, a router, a network PC, a peer device or other common network node, and can include many or all of the elements described above relative to the computer 500. Networking environments are commonplace in offices, enterprise-wide area networks ("WAN"), local area networks ("LAN"), intranets, and the Internet.

When used in a LAN or WLAN networking environment, the computer 500 may be coupled to the LAN through the network interface 596 or an adapter. When used in a WAN networking environment, the computer 500 typically includes a modem or other means for establishing communications over the WAN, such as the Internet or the network 106. The WAN may include the Internet, the illustrated network 106, various other networks, or any combination thereof. It will be appreciated that other mechanisms of establishing a communications link, ring, mesh, bus, cloud, or network between the computers may be used.

According to some embodiments, the computer 500 may be coupled to a networking environment. The computer 500 may include one or more instances of a physical computer-readable storage medium or media associated with the drives 530 or other storage devices. The system bus may enable the processor 510 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 520, whether characterized as RAM, ROM, flash, or other types of volatile or nonvolatile memory technology. The media may also represent secondary storage, whether implemented as the storage drives 530 or otherwise. Hard drive implementations may be characterized as solid state, or may include rotating media storing magnetically-encoded information.

The storage media may include one or more program modules 560. The program modules 560 may include software instructions that, when loaded into the processor 510 and executed, transform a general-purpose computing system into a special-purpose computing system. As detailed throughout this description, the program modules 560 may provide various tools or techniques by which the computer 500 may participate within the overall systems or operating environments using the components, logic flows, and/or data structures discussed herein.

The processor 510 may be constructed from any number of transistors or other circuit elements, which may individually or collectively assume any number of states. More specifically, the processor 510 may operate as a state machine or finite-state machine. Such a machine may be transformed to a second machine, or specific machine by loading executable instructions contained within the program modules 560. These computer-executable instructions may transform the processor 510 by specifying how the processor 510 transitions between states, thereby transforming the transistors or other circuit elements constituting the processor 510 from a first machine to a second machine. The states of either machine may also be transformed by receiving input from the one or more user input devices 590, the network interface 596, other peripherals, other interfaces, or one or more users or other actors. Either machine may also transform states, or various physical characteristics of various output devices such as printers, speakers, video displays, or otherwise.

Encoding the program modules 560 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 560 may transform the physical state of the semiconductor memory 520 when the software is encoded therein. For example, the software may transform the state of transistors, capacitors, or other discrete circuit elements constituting the semiconductor memory 520.

As another example, the storage media may be implemented using magnetic or optical technology such as drives 530. In such implementations, the program modules 560 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 6:
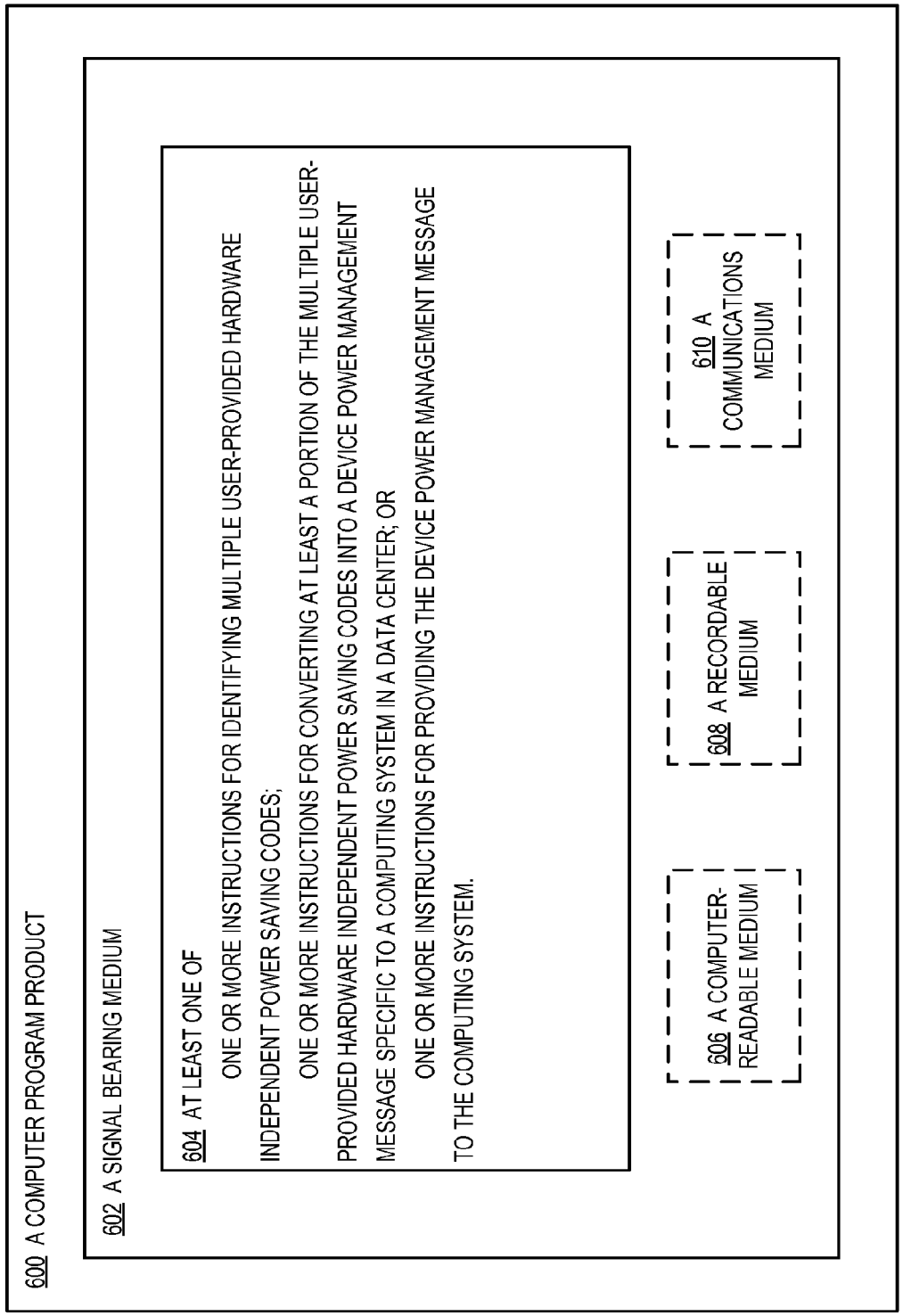
FIG. 6 is a schematic diagram illustrating a computer program product that includes a computer program for executing a computer process on a computing device.

FIG. 6 is a schematic diagram that illustrates a computer program product 600 that includes a computer program for executing a computer process on a computing device, arranged in accordance with at least some embodiments presented herein. An illustrative embodiment of the example computer program product is provided using a signal bearing medium 602, and may include at least one instruction of 604: one or more instructions for identifying multiple user-provided hardware independent power saving codes; one or more instructions for converting at least a portion of the multiple user-provided hardware independent power saving codes into a device power management message specific to a computing system in a data center; or one or more instructions for providing the device power management message to the computing system. In some embodiments, the signal bearing medium 602 of the one or more computer program products 600 include a computer readable medium 606, a recordable medium 608, and/or a communications medium 610.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the Detailed Description, claims, or Figures, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to provide power savings in a data center, the method comprising:
    identifying user-provided hardware independent power saving codes from multiple virtual machines within the data center;
    converting at least a portion of the user-provided hardware independent power saving codes into a device power management message specific to a computing system in the data center, wherein the converting includes identifying the portion of the user-provided hardware independent power saving codes relevant to the computing system and converting the portion of the user-provided hardware independent power saving codes into the device power management message specific to the computing system in the data center; and
    providing the device power management message to the computing system, wherein the computing system is operative to enable or disable one or more devices within the computing system in accordance with the device power management message.

2. The method of claim 1, further comprising:
    converting a second portion of the power saving codes into a second device power management message specific to a second computing system in the data center; and
    providing the second device power management message to the second computing system, wherein the second computing system is operative to enable or disable one or more devices within the second computing system in accordance with the second device power management message.

3. The method of claim 1, wherein identifying the user-provided hardware independent power saving codes comprises:
    providing an application programming interface adapted to enable a programmer to define the user-provided hardware independent power saving codes; and
    inserting the defined user-provided hardware independent power saving codes into application code via the application programming interface.

4. The method of claim 3, further comprising providing a power simulator adapted to enable the programmer to estimate power utilization of the computing system if the defined user-provided hardware independent power saving codes were to be implemented by the computing system in response to the execution of the application code.

5. The method of claim 1, wherein the computing system is operative to implement the portion of the user-provided hardware independent power saving codes that are relevant, and wherein the computing system is not operative to implement others of the user-provided hardware independent power saving codes that are not relevant.

6. The method of claim 1, wherein the computing system comprises a first virtual machine and a second virtual machine; and wherein the method further comprises:
    identifying a first plurality of user-provided hardware independent power saving codes from a first program code directed for execution by the first virtual machine;
    identifying a second plurality of user-provided hardware independent power saving codes from a second program code directed for execution by the second virtual machine;
    converting the first plurality of user-provided hardware independent power saving codes into a first device power management message specific to the computing system in the data center;
    converting the second plurality of user-provided hardware independent power saving codes into a second device power management message specific to the computing system in the data center;
    generating a combined device power management message by combination of the first device power management message and the second device power management message; and
    providing the combined device power management message to the computing system, wherein the computing system is operative to enable or disable one or more devices within the computing system according to the combined device power management message.

7. The method of claim 1, wherein at least one of the user-provided hardware independent power saving codes comprises a hardware independent power saving code adapted to indicate that a device that has been disabled will be needed in a specified amount of time.

8. The method of claim 7, wherein providing the device power management message to the computing system comprises:
    providing the device power management message to the computing system, wherein the computing system is operative to warm up the device prior to the specified time such the device is available by the specified time according to the device power management message.

9. The method of claim 1, further comprising:
    upon providing the device power management message to the computing system, logging current power utilization of the computing system implementing the user-provided hardware independent power saving codes;
    determining power savings based on the current power utilization; and
    providing a monetary benefit to the user according to the power savings.

10. The method of claim 1, wherein the device power management message comprises an array of symbols, wherein each of the symbols corresponds to one of the devices.

11. The method of claim 1, wherein identifying the user-provided hardware independent power saving codes from the multiple virtual machines within the data center comprises identifying the user-provided hardware independent power saving codes via a web service.

12. A non-transitory computer-readable storage medium having computer-executable instructions stored thereon which, when executed by a computer, cause the computer to:
    identify user-provided hardware independent power saving codes included within application code to be executed by multiple virtual machines within a computing system in a data center;
    convert at least a portion of the user-provided hardware independent power saving codes into a device power management message specific to the computing system, wherein to convert includes to identify the portion of the user-provided hardware independent power saving codes relevant to the computing system and to convert the portion of the user-provided hardware independent power saving codes into the device power management message specific to the computing system in the data center; and provide the device power management message to the computing system, wherein the computing system is operative to enable or disable one or more devices within the computing system according to the device power management message when the computing system executes the application code.

13. The non-transitory computer-readable storage medium of claim 12, wherein to identify the user-provided hardware independent power saving codes, the computer-executable instructions, when executed by the computer, further cause the computer to:

provide an application programming interface adapted to enable a programmer to define the user-provided hardware independent power saving codes; and insert the defined user-provided hardware independent power saving codes into application code via the application programming interface.

14. The non-transitory computer-readable storage medium of claim 13, further comprising computer-executable instructions stored thereon which, when executed by the computer, cause the computer to provide a power simulator adapted to enable the programmer to estimate power utilization of the computing system if the defined user-provided hardware independent power saving codes were to be implemented by the computing system in response to execution of the application code on the computing system.

15. The non-transitory computer-readable storage medium of claim 12, wherein the computing system is operative to implement the portion of the user-provided hardware independent power saving codes that are relevant, and wherein the computing system is not operative to implement others of the user-provided hardware independent power saving codes that are not relevant.

16. The non-transitory computer-readable storage medium of claim 12, wherein the computing system comprises a first virtual machine and a second virtual machine; and the computer-executable instructions, when executed by the computer, further cause the computer to:

identify a first plurality of user-provided hardware independent power saving codes from a first program code directed for execution by the first virtual machine;

identify a second plurality of user-provided hardware independent power saving codes from a second program code directed for execution by the second virtual machine;

convert the first plurality of user-provided hardware independent power saving codes into a first device power management message specific to the computing system in the data center;

convert the second plurality of user-provided hardware independent power saving codes into a second device power management message specific to the computing system in the data center;

generate a combined device power management message by combination of the first device power management message and the second device power management message; and provide the combined device power management message to the computing system, wherein the computing system is operative to enable or disable one or more devices within the computing system in accordance with the combined device power management message.

17. The non-transitory computer-readable storage medium of claim 12, wherein at least one of the user-provided hardware independent power saving codes comprises a hardware independent power saving code adapted to indicate that a device that has been disabled will be needed in a specified amount of time.

18. The non-transitory computer-readable storage medium of claim 17, wherein to provide the device power management message to the computing system, the computer-executable instructions, when executed by the computer, further cause the computer to:

provide the device power management message to the computing system, wherein the computing system is operative to warm up the device prior to the specified time such the device is available by the specified time according to the device power management message.

19. The non-transitory computer-readable storage medium of claim 18 comprising further computer-executable instructions stored thereon which, when executed by the computer, cause the computer to:

when the device power management message is provided to the computing system, log current power utilization of the computing system when the user-provided hardware independent power saving codes are implemented;

determine power savings based on the current power utilization; and provide a monetary benefit to the user according to the power savings.

20. The non-transitory computer-readable storage medium of claim 12, wherein the device power management message comprises an array of symbols, wherein each of the symbols corresponds to one of the devices.

21. A data center, comprising:

a first computing system that includes a first non-transitory computer-readable storage medium and a first processor-based hardware configuration comprising a first device and a first management unit coupled to the first device;

a second computing system that includes a second non-transitory computer-readable storage medium and a second processor-based hardware configuration comprising a second device and a second management unit coupled to the second device;

the first computing system operative to execute a first paravirtualized driver stored on the first non-transitory computer-readable storage medium, wherein the first paravirtualized driver is operative to identify a first portion of user-provided hardware independent power saving codes from application code executing on multiple first virtual machines within the first computing system, convert the first portion of the user-provided hardware independent power saving codes into a first device power management message specific to the first computing system in the data center, and provide the device power management message to the first management unit, wherein the first management unit is operative to enable and disable the first device according to the first device power management message; and the second computing system operative to execute a second paravirtualized driver stored on the second non-transitory computer-readable storage medium, wherein the second paravirtualized driver is operative to identify a second portion of the user-provided hardware independent power saving codes from the application code that executes on multiple second virtual machines within the second computing system, convert the second portion of the user-provided hardware independent power saving codes into a second device power management message specific to the second computing system in the data center, and provide the second device power management message to the second management unit, wherein the second management unit is operative to enable and disable the second device in accordance with the second device power management message.

22. The data center of claim 21, further comprising a power savings log unit coupled to the first computing system and the second computing system, wherein the power savings log unit is operative to log current power utilization of the first computing system and the second computing system when the user-provided hardware independent power saving codes are implemented, determine power savings based on the current power utilization, and provide a monetary benefit to the user according to the power savings.

* * * * *

UNITED STATES PATENT AND TRADEMARK OFFICE
CERTIFICATE OF CORRECTION

PATENT NO. : 8,938,634 B2  
APPLICATION NO. : 13/514337  
DATED : January 20, 2015  
INVENTOR(S) : Kruglick Page 1 of 1

It is certified that error appears in the above-identified patent and that said Letters Patent is hereby corrected as shown below:

In The Specification

In Column 1, line 3, below Title, insert -- CROSS-REFERENCE TO RELATED APPLICATIONS --.

In Column 1, line 4, before "Background", insert
-- This application is a U.S. national stage filing under 35 U.S.C §371 of International Application No. PCT/US2012/022541, filed on Jan. 25, 2012. --.

In Column 1, Line 45, delete "DESCRIPTION" and insert -- BRIEF DESCRIPTION --, therefor.

Signed and Sealed this
Sixth Day of October, 2015

Michelle K. Lee
*Director of the United States Patent and Trademark Office*